US012014704B2

(12) United States Patent
Rannells et al.

(10) Patent No.: US 12,014,704 B2
(45) Date of Patent: Jun. 18, 2024

(54) OUTDOOR MUSHROOM INSTRUMENTS

(71) Applicant: PlayCore Wisconsin, Inc., Chattanooga, TN (US)

(72) Inventors: Joshua Rannells, Eau Claire, WI (US); Richard Cooke, Hesperus, CO (US); Lindsay Hill, Chattanooga, TN (US); Kate Morrison, Signal Mountain, TN (US)

(73) Assignee: PLAYCORE WISCONSIN , INC., Chattanooga, TN (US)

( * ) Notice: Subject to any disclaimer, the term of this patent is extended or adjusted under 35 U.S.C. 154(b) by 0 days.

(21) Appl. No.: 18/241,635

(22) Filed: Sep. 1, 2023

(65) Prior Publication Data

US 2024/0029690 A1 Jan. 25, 2024

Related U.S. Application Data

(63) Continuation of application No. 17/512,140, filed on Oct. 27, 2021, now Pat. No. 11,749,236.

(60) Provisional application No. 63/105,957, filed on Oct. 27, 2020.

(51) Int. Cl.

*G10D 13/06* (2020.01)
*G10D 13/12* (2020.01)
*G10D 13/24* (2020.01)
*G10G 5/00* (2006.01)

(52) U.S. Cl.

CPC ............. *G10D 13/06* (2013.01); *G10D 13/12* (2020.02); *G10D 13/24* (2020.02); *G10G 5/005* (2013.01)

(58) Field of Classification Search

CPC ........ G10D 13/06; G10D 13/24; G10D 13/12; G10G 5/005

See application file for complete search history.

(56) References Cited

U.S. PATENT DOCUMENTS

| | | | | |
|---|---|---|---|---|
| 1,596,495 | A * | 8/1926 | La Londe | G10D 13/06 984/154 |
| 3,673,909 | A * | 7/1972 | Birnkrant | G10D 13/08 84/404 |
| 4,949,385 | A * | 8/1990 | Murphy | G10K 1/10 446/166 |
| 7,199,297 | B2 * | 4/2007 | Anderson | G10D 13/24 84/422.3 |
| 9,734,808 | B2 * | 8/2017 | Keller | G10D 13/02 |
| 10,650,793 | B2 * | 5/2020 | Cooke | G10G 5/00 |
| 10,896,662 | B2 * | 1/2021 | Wish | G10D 13/06 |
| 11,200,873 | B2 * | 12/2021 | Cooke | G10D 13/08 |
| D948,602 | S * | 4/2022 | Rannells | D17/22 |
| D948,603 | S * | 4/2022 | Rannells | D17/22 |
| 11,410,636 | B2 * | 8/2022 | Cooke | G10D 13/08 |

(Continued)

*Primary Examiner* — Robert W Horn

(74) *Attorney, Agent, or Firm* — McAndrews, Held & Malloy, Ltd.

(57) ABSTRACT

The present disclosure relates to outdoor musical instruments configured to replicate the appearance of a mushroom and to withstand prolonged exposure to the environment. The musical instrument is made up of at least a metal dish mounted to a weather-resistant support post. The metal dish is mounted to the top of the support post, and the bottom surface of the metal dish is separated from the top end of the support post by a non-metal isolator. The musical instrument is configured to produce a note that sustains when the top surface of the metal dish is struck by a mallet.

20 Claims, 13 Drawing Sheets

(56) References Cited

U.S. PATENT DOCUMENTS

| | | | | |
|---|---|---|---|---|
| 11,749,236 | B2 * | 9/2023 | Rannells | G10D 13/24<br>84/402 |
| 11,908,435 | B2 * | 2/2024 | Cooke | G10D 13/08 |
| 2006/0027072 | A1 * | 2/2006 | Morelli | G10D 13/28<br>84/422.3 |
| 2017/0110100 | A1 * | 4/2017 | Keller | G10D 13/22 |
| 2021/0193091 | A1 * | 6/2021 | Jones | G10D 13/10 |
| 2024/0029690 | A1 * | 1/2024 | Rannells | G10G 5/005 |

* cited by examiner

OUTDOOR MUSHROOM INSTRUMENTS

The present application claims priority to U.S. Provisional Patent Application No. 63/105,957, filed on Oct. 27, 2020, the entirety of which is incorporated by reference herein.

BACKGROUND

Research has shown that musical play is a key component of development in children. Music helps to build reasoning skills and cognitive development. It can increase the capacity of one's memory, refine time management and organizational skills, and teach perseverance. Playing music builds confidence, encourages creativity and self-expression. It can reduce anxiety, relieve symptoms of depression, and elevate one's mood. The Brain and Creativity Institute found that musical experiences in childhood can accelerate brain development, particularly in the areas of language acquisition and reading skills.

Research has also shown that being outside enhances a child's development. Nature is important to children's development in every major way—intellectually, emotionally, socially, spiritually and physically. Kellert, Stephen R., "Nature and Childhood Development", *In Building for Life: Designing and Understanding the Human-Nature Connection*, Island Press, 2005. "Experience of the outdoors has the potential to confer a multitude of benefits on young people's physical development, emotional and mental health and well-being and societal development. Mental health and wellbeing benefits from play in natural settings appear to be long-term, realized in the form of emotional stability in young adulthood." Travlou, Penny, "Wild Adventure Space For Young People", *OPENspace Individual Literature Reviews* (2006).

As such, instruments placed in outdoor learning environments enable "children to explore natural sounds in the environment, make loud music, compose music individually and collaboratively, and move expressively." Spencer, Karin H, et al., Quality Outdoor Play Spaces for Young Children, *Young Children*, pp 28-34 (2014).

SUMMARY OF THE INVENTION

Embodiments of the present disclosure are directed to an outdoor musical instrument made up of at least a metal dish mounted to a support post, the outdoor musical instrument being configured to withstand prolonged exposure to the environment. The support post has a top end and a bottom end, the bottom end being configured for mounting to an outdoor surface. The metal dish has a top surface and a bottom surface. The metal dish is curved, preferably continuously, downward from a central region to a lower circumferential edge. The metal dish is mounted to the top of the support post, and the bottom surface of the metal dish is separated from the top end of the support post by a non-metal isolator. The outdoor musical instrument is configured to produce a note that sustains for at least five seconds when the top surface of the metal dish is struck by a mallet. In some embodiments, a mallet for striking the top surface of the metal dish may be attached to the musical instrument, e.g. to the support post, by a cable.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
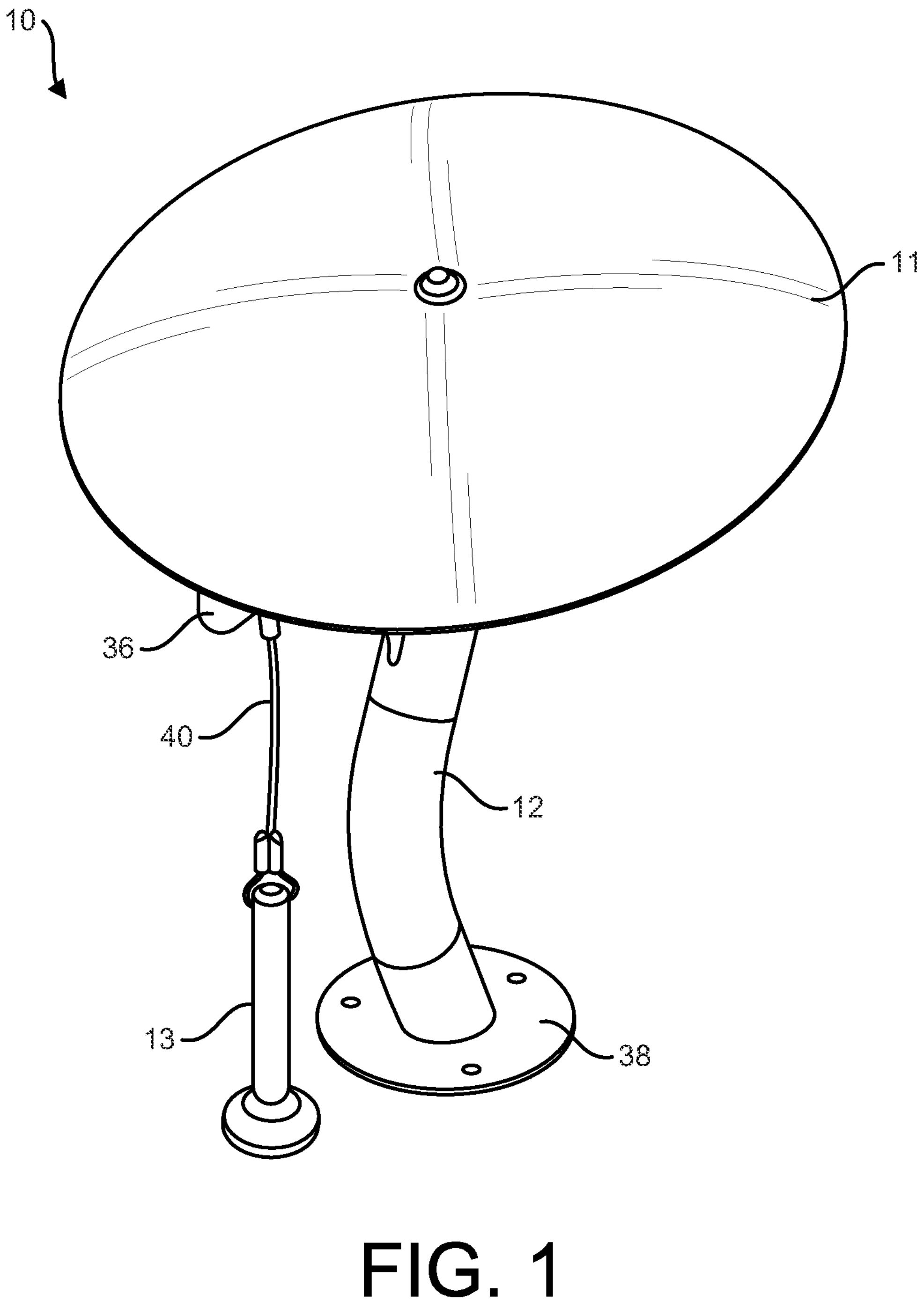
FIG. 1 is a top perspective view of an embodiment of an outdoor mushroom instrument of the present disclosure.
Figure 2:
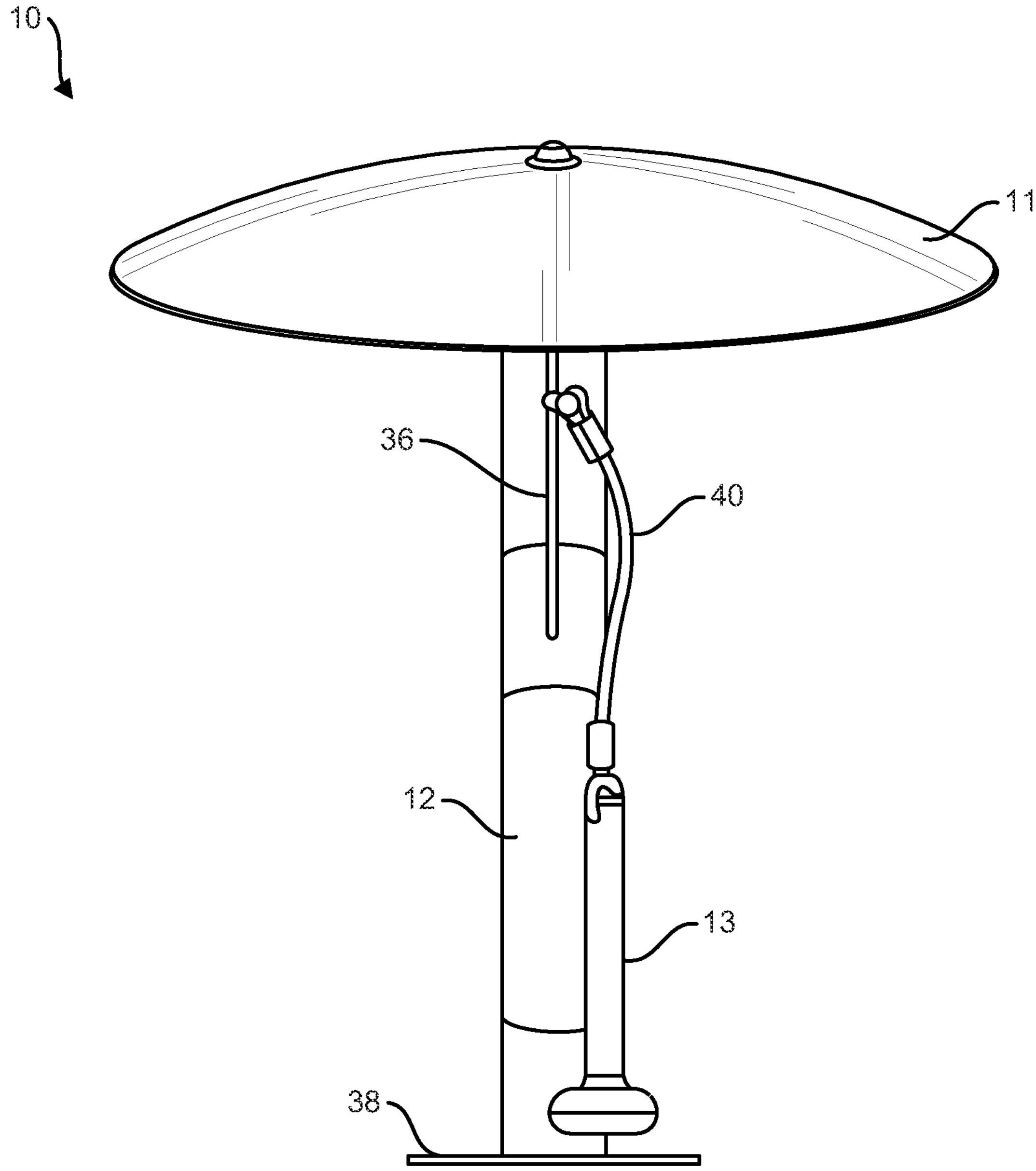
FIG. 2 is a front elevation view of the embodiment shown in FIG. 1.
Figure 3:
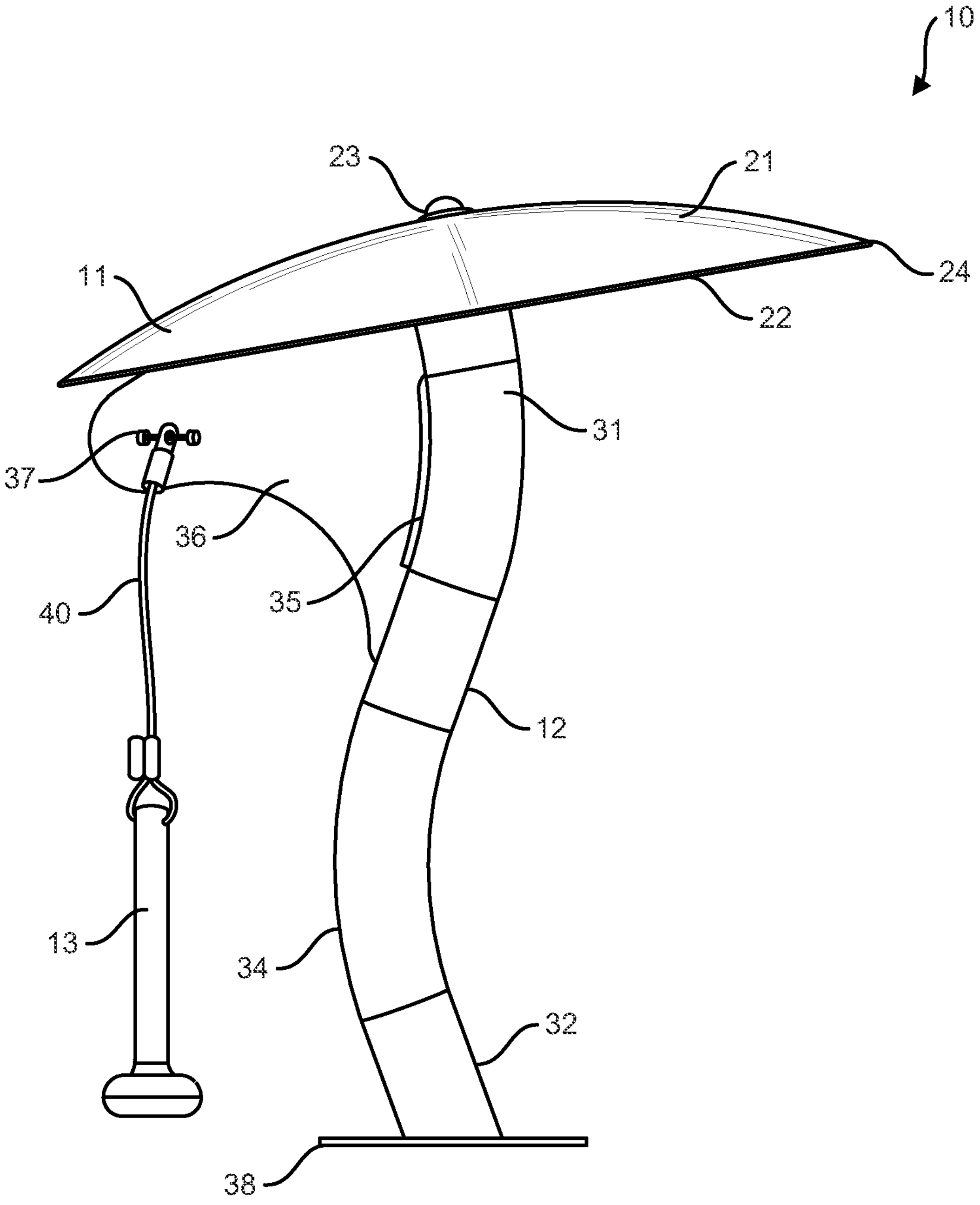
FIG. 3 is a side elevation view of the embodiment shown in FIG. 1.

Embodiments of the present disclosure are directed to an outdoor instrument 10 and/or to a set of such instruments that may be mounted in close proximity to one another to provide a unique outdoor musical play experience. One such embodiment is shown, for example, in FIGS. 1 to 6. The illustrated embodiment comprises a metal dish 11, a support post 12, and a mallet 13 that can be used to strike the metal dish to cause the metal plate to reverberate at a particular pitch, or note. In some embodiments, including that shown in FIGS. 1 to 6, the musical instrument 10 may be configured to replicate the appearance of a mushroom, with the metal dish 11 replicating a mushroom cap and support post 12 replicating a mushroom stem. By providing a musical instrument 10 that replicates the appearance of a mushroom in this manner, embodiments of the present invention integrate the musical instrument into a natural setting in a playful manner and also increase the enjoyment that children and adults alike will have playing the musical instrument.

The metal dish 11 has a top surface 21 and a bottom surface 22. The metal dish has a generally circular shape, and is curved downward, preferably continuously, from an upper central region 23 to a lower circumferential edge 24. In some embodiments, the metal dish 11 may have a radius of curvature (as measured from the top surface 21, i.e. an outer radius of curvature as opposed to an inner radius of curvature) between about 5 inches and about 60 inches, alternatively between about 5 inches and about 50 inches, alternatively between about 10 inches and about 60 inches, alternatively between about 10 inches and about 50 inches, alternatively between about 10 inches and about 45 inches, alternatively between about 10 inches and about 40 inches, alternatively between about 15 inches and about 35 inches, alternatively between about 20 inches and about 30 inches. In the embodiment shown in FIGS. 1-6, for example, the metal dish has a radius of curvature of about 26 inches. In other embodiments, rather than a single, continuous radius of curvature, the metal dish 11 may comprise a first section that is curved downward from the upper central region 23 to a defined radial distance at a first radius of curvature and a second section that is curved downward from the defined radial distance to the lower circumferential edge 24 at a second radius of curvature. In some embodiments, the metal dish 11 may further comprise a portion that extends downward from the lower circumferential edge 24 along the periphery of the dish.

By providing a metal dish 11 that is shaped and curved in this manner, the metal dish 11 may replicate the cap of a mushroom, particularly when mounted on the top end of a support post that is configured to extend from an outdoor surface.

Because the curvature of the metal dish affects the sound that is produced when struck by a mallet, the curvature of the metal dish 11 is configured to both (a) produce the desired sound when the dish is mounted to the top of support post 12 and struck by mallet 13 and (b) replicate the shape of a mushroom cap. In other (non-illustrated) embodiments, the metal dish 11 may be flat or substantially flat, although such embodiments would produce a different sound and fail to replicate the shape of a mushroom cap.

The curvature of the metal dish 11 is also closely related to the height of the dish (for a metal dish having a given diameter), i.e. the distance between the upper central portion 23 and the lower circumferential edge 24. In some embodiments the metal dish 11 may have a height between about 1 inches and about 15 inches, alternatively between about 2 inches and about 14 inches, alternatively between about 2 inches and about 12 inches, alternatively between about 2 inches and about 10 inches, alternatively between about 2 inches and about 8 inches, alternatively between about 2 inches and about 6 inches, alternatively between about 2 inches and about 5 inches. In most embodiments, the height of the metal dish 11 should not exceed the radius of curvature of the metal dish, otherwise the metal dish will start to curve inward toward the support post 12 (which will have negative effects on both the sound and appearance of the musical instrument).

In addition to the curvature of the metal dish 11, the sound produced by the metal dish 11 when struck by a mallet 13 depends on a variety of additional factors, including the diameter of the dish, the thickness of the dish, the material from which the dish is made, the manner in which the dish is mounted to the support post 12, etc. In some embodiments, the musical instrument 10 may be configured so that, when struck by mallet 13, the metal dish 11 produces a particular pitch, or note, having a full, round sound that resonates for a relatively long period of time.

The note that is produced by the metal dish 11 is controlled by the configuration of the dish itself, including the diameter of the dish, the thickness of the dish, and the curvature of the dish. In some embodiments, the metal dish 11 may have a diameter between 12 inches and 36 inches, alternatively between 16 inches and 32 inches, alternatively between 18 inches and 30 inches, alternatively between 20 and 28 inches. It has presently been found that dishes 11 having diameters and curvatures according to the above ranges provide an upper surface 21 of a desired size for being struck by a mallet and produce a desirable pitch when struck by a mallet. In some embodiments, the metal dish may have a thickness between 1/16 inch and 1 inch, alternatively between 1/16 inch and 3/4 inch, alternatively between 1/16 inch and 1/2 inch.

In other embodiments, however, the metal dish 11 may have a diameter and/or curvature and/or thickness smaller than the above-recited ranges, though it is expected that the produced sound will differ from what would be produced by dishes falling within the above diameter and/or curvature ranges. Similarly, in other embodiments, the metal dish 11 may have a diameter and/or curvature and/or thickness larger than the above-recited ranges, though it is expected that the produced sound will differ from what would be produced by dishes falling within the above diameter and/or curvature ranges.

The metal dish may be produced from any of a variety of metals. In some preferred embodiments, the metal dish 11 may be aluminum or an aluminum alloy. It has been found that aluminum alloys, when formed into the shapes and general dimensions described above, can be tuned to consistently produce a pitch of a particular note when struck by a mallet and provide desirable properties for outdoor use. For instance, in some embodiments, the metal dish 11 may be produced from an aluminum-magnesium alloy. Additionally, the metal dish 11 may be treated to provide weather-resistance. For instance, where the metal dish 11 is an aluminum or an aluminum alloy, the surfaces of the metal dish may be anodized. Anodization of the metal dish increases corrosion resistance and also allows for dyeing with any of a variety of desirable colors, e.g. red, blue, green, yellow, orange, purple, brown, etc.

In some embodiments, the metal dish 11 may be free from surface patterns, e.g. may be a solid color such as red. In other embodiments, however, the upper surface 21 of the metal dish 11 may be etched to provide one or more surface patterns. In some embodiments, the upper surface 21 of the metal dish 11 may be etched to include a plurality of circular dots 26. The plurality of dots 26 may, for example, replicate the scales of a mushroom. Each of the plurality of dots 26 may be provided with a color than differs from the color of the rest of the upper surface 21.

Figure 10:
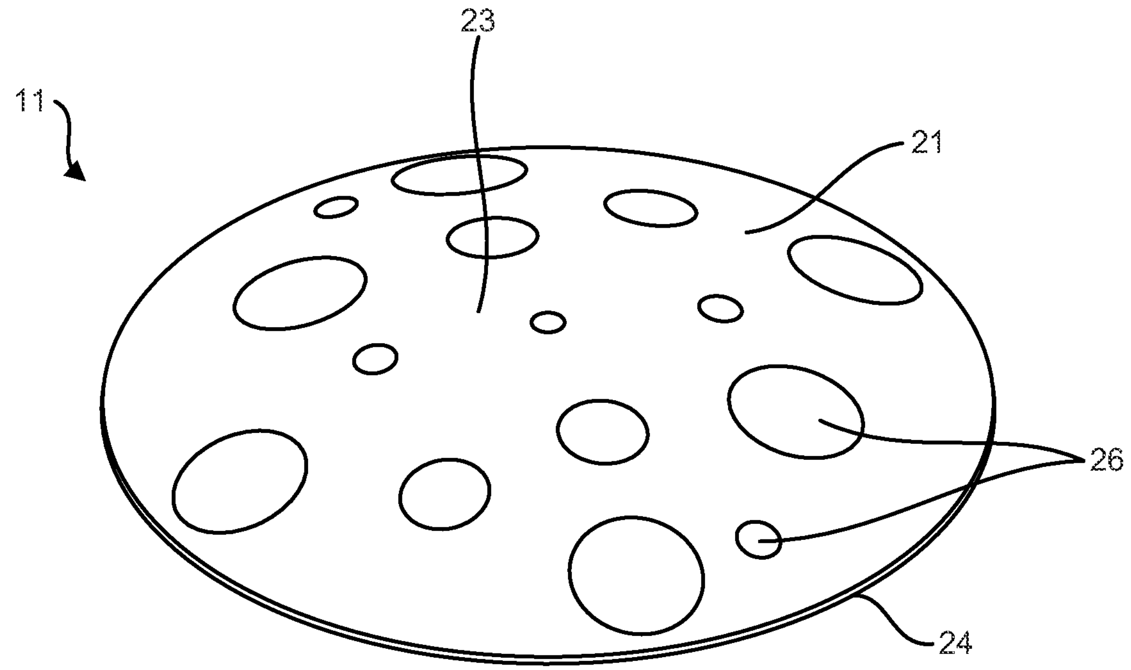
FIG. 10 is a top perspective view of a dish according to an embodiment of the present disclosure, showing dots etched on the top surface of the dish.
Figure 11:
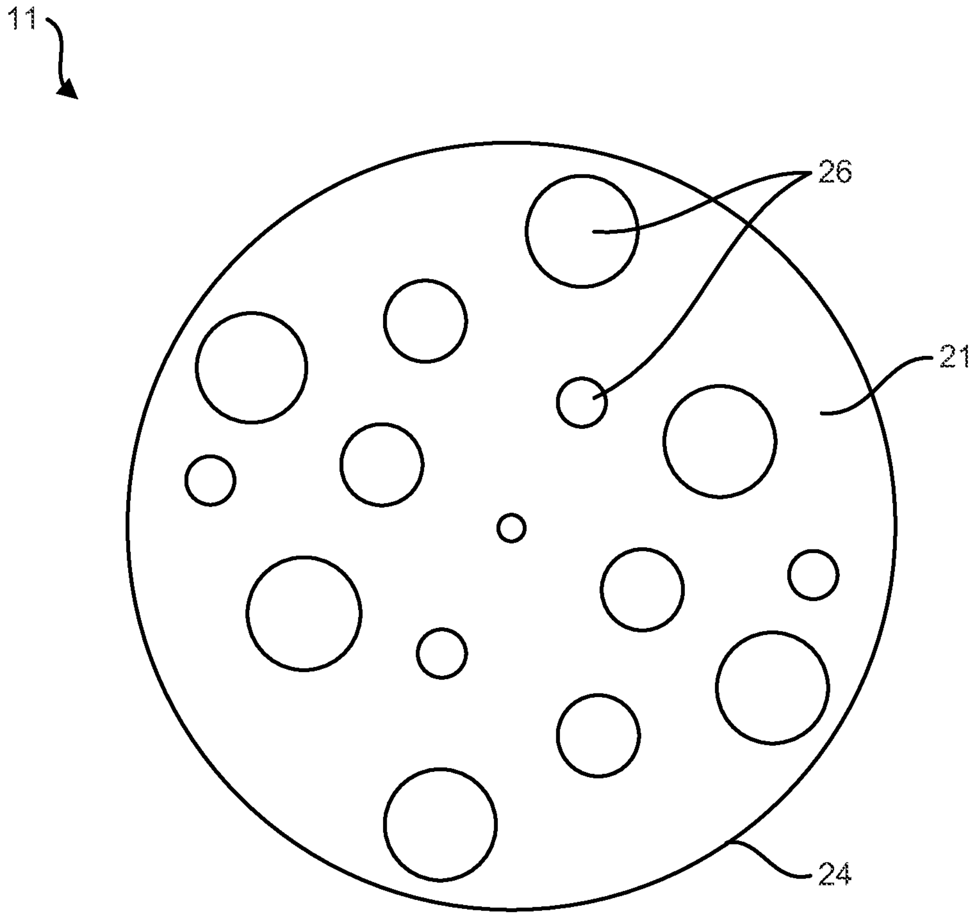
FIG. 11 is a top plan view of the embodiment shown in FIG. 10.
Figure 13:
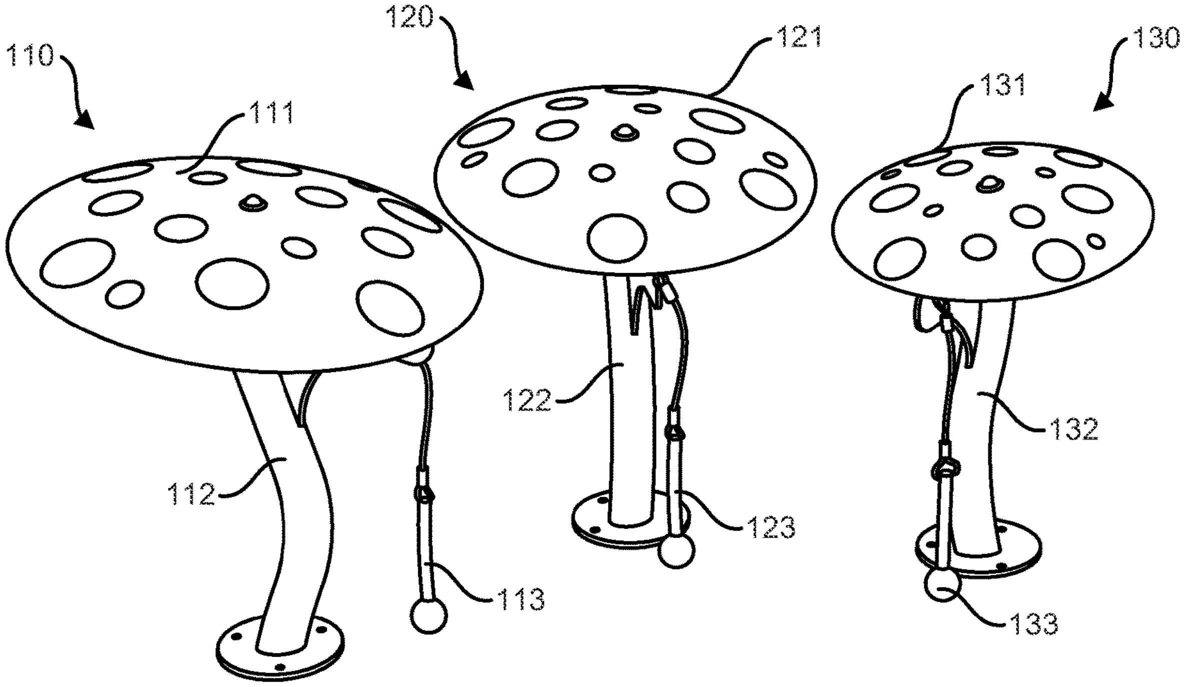
FIG. 13 is a perspective view of embodiments of outdoor mushroom instruments of different sizes mounted adjacent one another to create a unique play experience.

An example of such a surface pattern is illustrated in FIGS. 10-11 and 13. In the illustrated embodiment, the upper surface 21, which is dyed red, comprises a plurality of etched dots 26, each of which is dyed white. While the red and white color contrast provides a metal dish that replicates the cap and scales of a well-known mushroom cap, any combination of color contrasts are contemplated. The inclusion of a surface pattern on the upper surface 21 of the metal dish 11 may also provide an additional play opportunity and/or enhanced play experience. For instance, the etching of dots 26, and in particular color-contrasting dots, on the upper surface 21 of the metal dish 11 provides an enhanced play experience, as children will enjoy striking the variety of dots with the mallet 13. The number, arrangement, and sizes of the dots 26 shown in the Figures is illustrative of an example only and does not limit the present disclosure unless otherwise stated.

In some (non-illustrated) embodiments, the lower surface 22 of the metal dish 11 may also be etched to provide one or more surface patterns. For instance, in some embodiments, the lower surface 22 of the metal dish 11 may be etched to provide a plurality of radial lines, e.g. to replicate the gills of a mushroom. Moreover, in some embodiments, the lower surface 22 of the metal dish 11 may be dyed a different color than the upper surface 21.

In some embodiments, the circumferential edge 24 of the metal dish 11 may be rounded. An example of a metal dish 11 having a rounded circumferential edge 25 is shown, for example, in FIG. 5. The rounding of the circumferential edge 24 helps prevent injury.

The outdoor musical instrument 10 also comprises a support post 12 that supports the metal dish 11 in an elevated position relative to a ground surface. The support post comprises a top end 31 and a bottom end 32. As shown in the illustrated embodiments, the metal dish 11 may be mounted to the top end 31 of the support post and the bottom end 32 of the support post may be configured to be mounted to an outdoor surface.

The support post 12 may be made from any of a variety of materials, so long as the support post has the necessary strength and weather resistance to stand up to prolonged outdoor environmental exposure and use. In some embodiments, the support post 12 may comprise powder-coated steel pipe. The powder coating serves to protect the steel against corrosion and other environmental degradation. The powder coating can also provide the support post 12 with any of a variety of colors. As an alternative to powder coating, the steel pipe may be galvanized.

The support post 12 may have any of a variety of shapes. In some embodiments, the support post 12 may have one or more curved sections. In the illustrated embodiments, for example, the support post 12 is curved so that a front face of the support post has a convex portion 34 and a concave portion 35. By providing the support post 12 with curves in this manner, a desirable natural appearance may be produced. The curvature of the support post 12, however, is not limited to providing a desirable natural appearance. Rather, the curvature of the support post 12 may serve to place the top of the support post 31 at a desirable angle to provide an improved play experience.

In some embodiments, for example, the top surface of the support post 31 may form an angle between about 5 and about 30 degrees, alternatively between about 5 and about 25 degrees, alternatively between about 5 and about 20 degrees, alternatively between about 5 and about 15 degrees with respect to the ground surface to which the musical instrument 10 is mounted. This provides that the metal dish 11 may be placed at a small angle with the ground surface to which the musical instrument 10 is mounted, i.e. the metal dish being non-parallel with the ground surface or other than horizontal. Placing the metal dish 11 at an angle other than parallel with the ground surface makes the dish more visible and thus helps to prevent accidental contact, e.g. by a running child. It also provides a desirable angle for children of all heights to play the musical instrument 10 by striking the top surface 21 of the metal dish 11 with the mallet 13. In other embodiments, however, the top surface of the support post 12, and thus the metal dish 11, may be substantially parallel with the ground surface to which the musical instrument 10 is mounted (i.e. horizontal).

In other (non-illustrated) embodiments, the support post 12 may be straight. A straight support post 12 may be vertical, i.e. the longitudinal axis of the support post may be perpendicular (90 degrees) relative to the ground surface to which it is mounted. However, more desirably, a straight support post 12 may extend at a non-vertical angle with the ground surface. For example, the longitudinal axis of a straight support post 12 may form an angle between about 60 degrees and about 85 degrees with the ground surface, alternatively between about 70 degrees and about 85 degrees with the ground surface. By extending at an angle with respect to the ground surface, the top end 31 of the support post 12, and the dish 11 mounted to that top end, may be placed at an angle other than horizontal, which, as described above, provides an improved play experience.

In some (non-illustrated) embodiments, a plurality of support posts 12 may be connected or integrally formed to have a shared bottom end 32 but a plurality of top ends 31 that support a plurality of metal dishes 11. For instance, in some embodiments a plurality of support posts 12 may extend in different directions and/or at different angles from a common, or shared, bottom end portion 32. Or a second support post 12 may extend from an intermediate portion of a first support post such that the first and second support posts have a single bottom end portion 32, and metal dishes 11 may be mounted to the tops of each of the first and second support posts. While not illustrated, a variety of different integrated multi-post (and dish) arrangements are contemplated without departing from the scope of the present disclosure.

Desirably, one or more mallets 13 may be mounted to the support post 12. In other (non-illustrated) embodiments, an additional mallet-support structure may be provided in the vicinity of the musical instrument 10. In some embodiments, the one or more mallets 13 may be mounted directly to the support post 12, i.e. to the portion of the support post that extends between the upper and lower ends 31, 32. In other embodiments, including the illustrated embodiments, however, the support post 12 may comprise a plate 36 that extends radially below the metal dish 11 and the one or more mallets 13 may be mounted, via cable(s) 40, to the plate 36. In the illustrated embodiments, for example, the plate 36 extends from the concave 35 portion of the support post 12, which is positioned above the convex portion 34 and at or near the top end 31 of the support post.

By providing a plate 36, e.g. a metal plate, that extends radially below the metal dish 11, embodiments of the musical instrument 10 provide an attachment point 37 for a mallet cable 40 that is relatively close, at least in a radial dimension and desirably also vertically, to the circumferential edge 24 of the metal dish 11. It has presently been recognized that the attachment of the mallet cable 40 to the support post 12 itself (a) requires the use of a relatively long mallet cable and (b) can result in the mallet cable interfering with the resonance of the metal dish 11 during use, particularly in those embodiments in which the metal dish 11 has a relatively large diameter. The plate 36 positions the mallet attachment point 37 a radial distance away from the support post 12 itself, thereby allowing the use of a shorter mallet cable 40 and preventing interference between the mallet cable and the metal dish 11 during use.

In some embodiments, the mallet attachment point 37 may be close, in a radial dimension, to the outer circumferential edge 24 of the metal plate. For instance, the mallet attachment point 37 may be positioned radially within 12 inches of the outer circumferential edge 24 of the metal dish, alternatively within 10 inches, alternatively within 8 inches, alternatively within 6 inches, alternatively within 4 inches. Accordingly, the cable 40 may have a length (as measured between the mallet attachment point 37 and the point of attachment between the cable and the mallet 13 when fully extended) that is less than 24 inches, alternatively less than 23 inches, alternatively less than 22 inches, alternatively less than 21 inches, alternatively less than 20 inches. Shorter cables 40 are generally desirable, as they are less likely to get wrapped around or caught on users or other objects.

The term cable 40, as used herein, is intended to comprise any flexible element by which a mallet 13 may be suspended and yet allows a user to grab the mallet and use the mallet to strike the upper surface 21 of the metal dish, and includes for example chains, ropes, cords, and the like.

In some embodiments, including that illustrated for example, the plate 36 may also be positioned at or near the top 31 of the support post, such that the plate 36 is positioned close to the lower surface 22 of the metal dish 11. This may serve to prevent the metal dish 11 from being bent down to an undesirable angle that could cause damage to the dish and/or to the elements by which the dish is mounted to the support post 12. For instance, should a child press down or sit on the upper surface 21 of the metal dish 11 in the vicinity of the plate 36, the lower surface of the dish 22 would come into contact with the plate and thereby prevent further downward deflection.

The support post 12 may further comprise a base plate 38 at the lower end 32. As illustrated, the base plate 38 may have a larger radial dimension than the support post 12 itself and may be configured to mounting to an outdoor ground surface in any of a variety of ways. In some embodiments, the base plate 38 may comprise one or more, and preferably a plurality, of apertures 39, each of which is configured to receive one or more fasteners 50. The one or more fasteners 50 may comprise any conventional fasteners, including for example, screws, bolts, nuts, expansion anchors, and the like.

Figure 7:
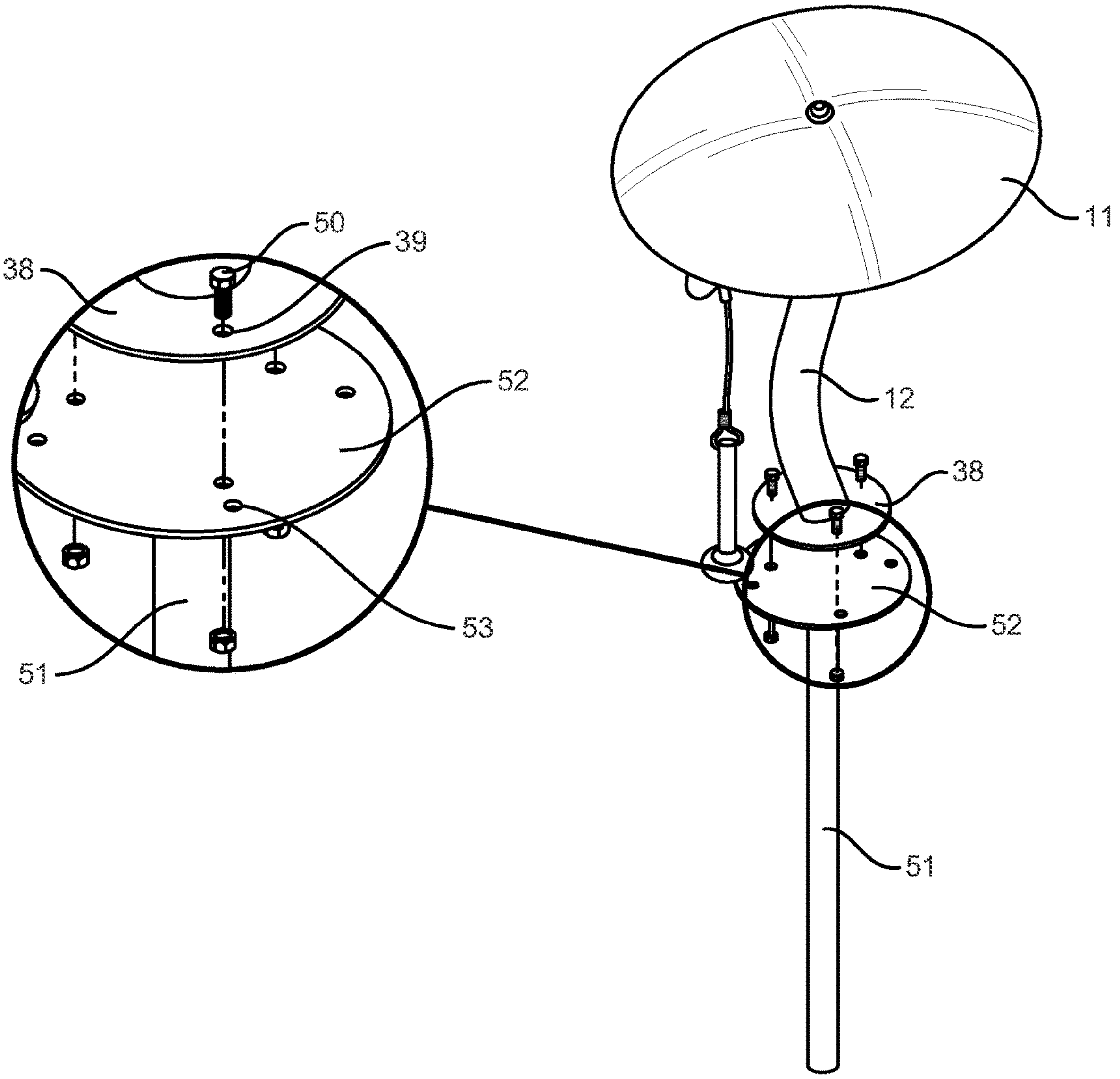
FIG. 7 is a perspective view of an embodiment of an outdoor mushroom instrument of the present disclosure, having an in-ground steel post extension for mounting the mushroom instrument in an outdoor environment.

In some embodiments, the musical instrument 10 may comprise an in-ground post 51, such as that illustrated in FIG. 7. The in-ground post 51 may comprise an upper plate 52 having one or more, and preferably a plurality, of apertures 53 configured to receive the one or more fasteners 50, by which the base plate 38 of the support post 12 and the upper plate 52 of in-ground post 51 may be secured. The in-ground post 51 may be positioned under a ground surface and serve to securely and stably mount the musical instrument 10 to the ground surface.

Figure 8:
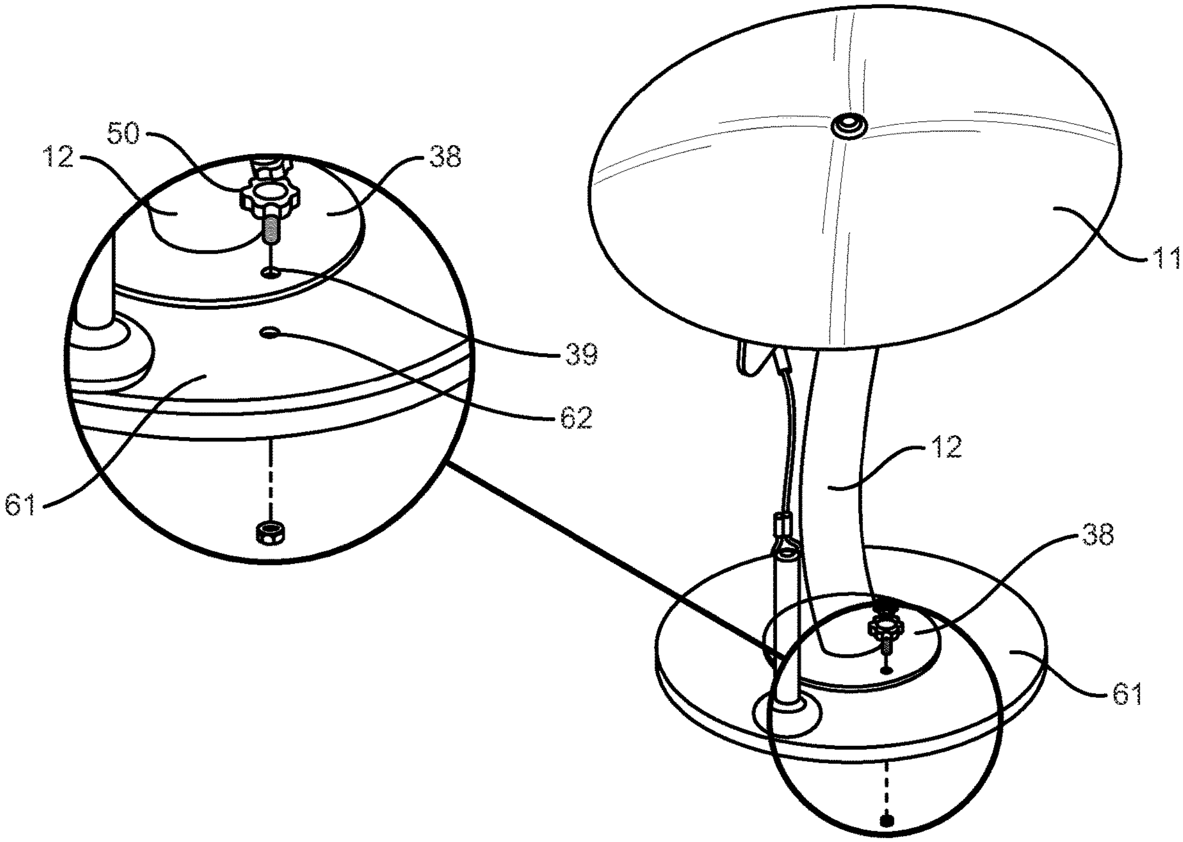
FIG. 8 is a perspective view of an embodiment of an outdoor mushroom instrument of the present disclosure, having a portable stand.

In some embodiments, the musical instrument 10 may comprise a portable stand 61 such as that illustrated in FIG. 8. The portable stand 61 has a larger radius than the base plate 38 so as to prevent tipping of the musical instrument 10. The portable stand 61 is also configured to withstand prolonged exposure to the outdoor environment. In some embodiments, the portable stand 61 may comprise one or more, and preferably a plurality, of apertures 62 configured to receive the one or more fasteners 50, by which the base plate 38 of the support post 12 and the portable stand 61 may be secured. In some embodiments, including that illustrated in FIG. 8, the one or more fasteners 50 may comprise one or more thumb screws.

Figure 9:
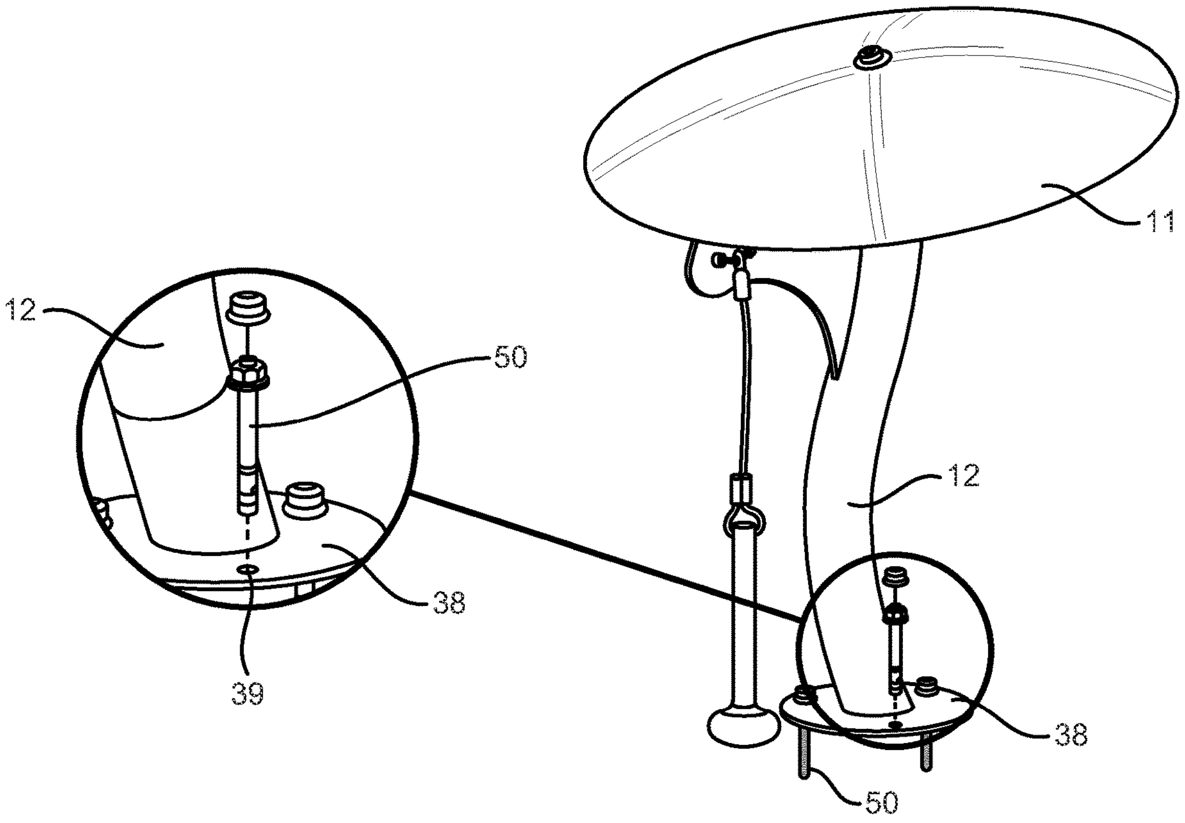
FIG. 9 is a perspective view of an embodiment of an outdoor mushroom instrument of the present disclosure, having a surface mount for mounting the mushroom instrument in an outdoor environment.

In some embodiments, as illustrated in FIG. 9 for example, the base plate 38 may be mounted directly to an outdoor surface, without the use of an in-ground post 51 or portable stand 61. For instance, the one or more fasteners 50 may pass through the one or more apertures 39 in base plate 38 and directly into a ground surface, such as a concrete or other artificial surface material. In some embodiments, including that illustrated in FIG. 9, the one or more fasteners 50 may comprise one or more concrete (e.g. expansion) anchors, concrete screws, or the like.

By providing a base plate 38 having one or more, and preferably a plurality, or apertures 39, embodiments of the musical instrument disclosed herein may be mounted in an outdoor environment in any of the above-described manners.

The musical instrument 10 is desirably configured such that when the top surface 21 of the metal dish 11 is struck by a mallet 13, the metal dish with reverberate and produce a sound of a predetermined pitch (note) for a period of time. In other words, the sound or note will sustain for a period of time. In some embodiments, for example, the musical instrument may be configured so that the note sustains for at least 5 seconds, alternatively at least 8 seconds, alternatively at least 10 seconds, alternatively at least 12 seconds, alternatively at least 15 seconds, alternatively at least 18 seconds, alternatively at least 20 seconds. To provide for a note that sustains for a period of time, the metal dish 11 is mounted to the top of the support post 12 in a manner by which a non-metal isolator 70 separates the bottom surface 22 of the metal dish 11 from the top end 31 of the support post 12.

Figure 4:
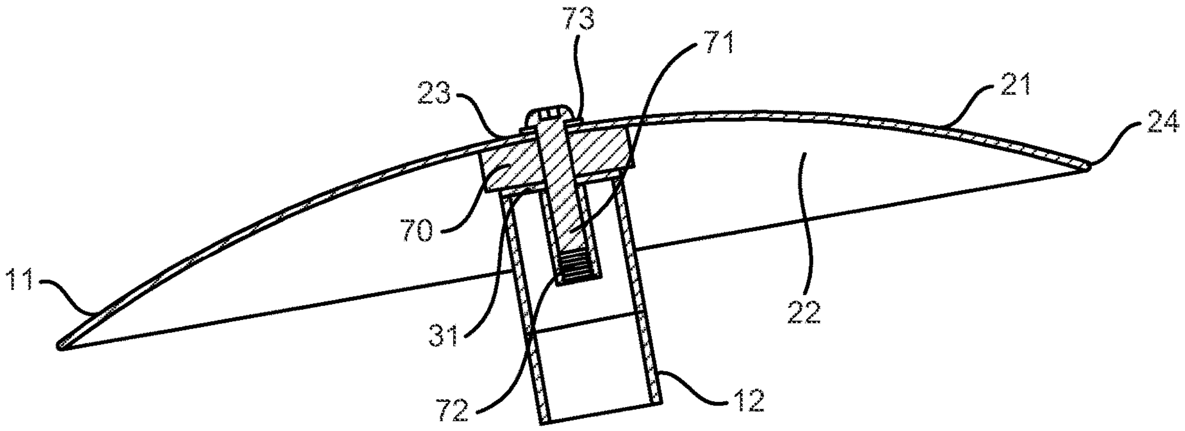
FIG. 4 is a cutaway view of a portion of the embodiment shown in FIG. 1, showing the interface of the dish and the support post.
Figure 5:
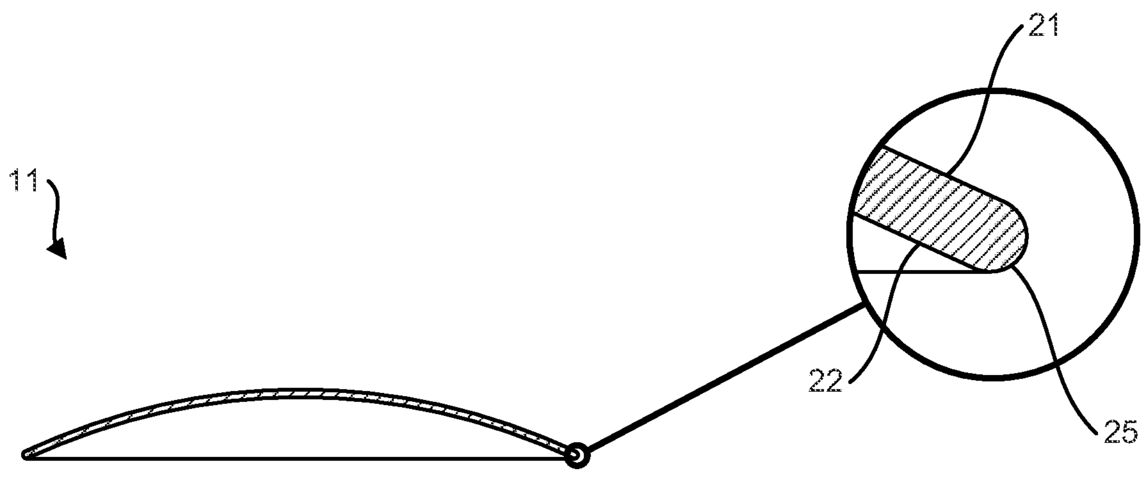
FIG. 5 is cutaway view of a dish according to an embodiment of the present disclosure.
Figure 6:
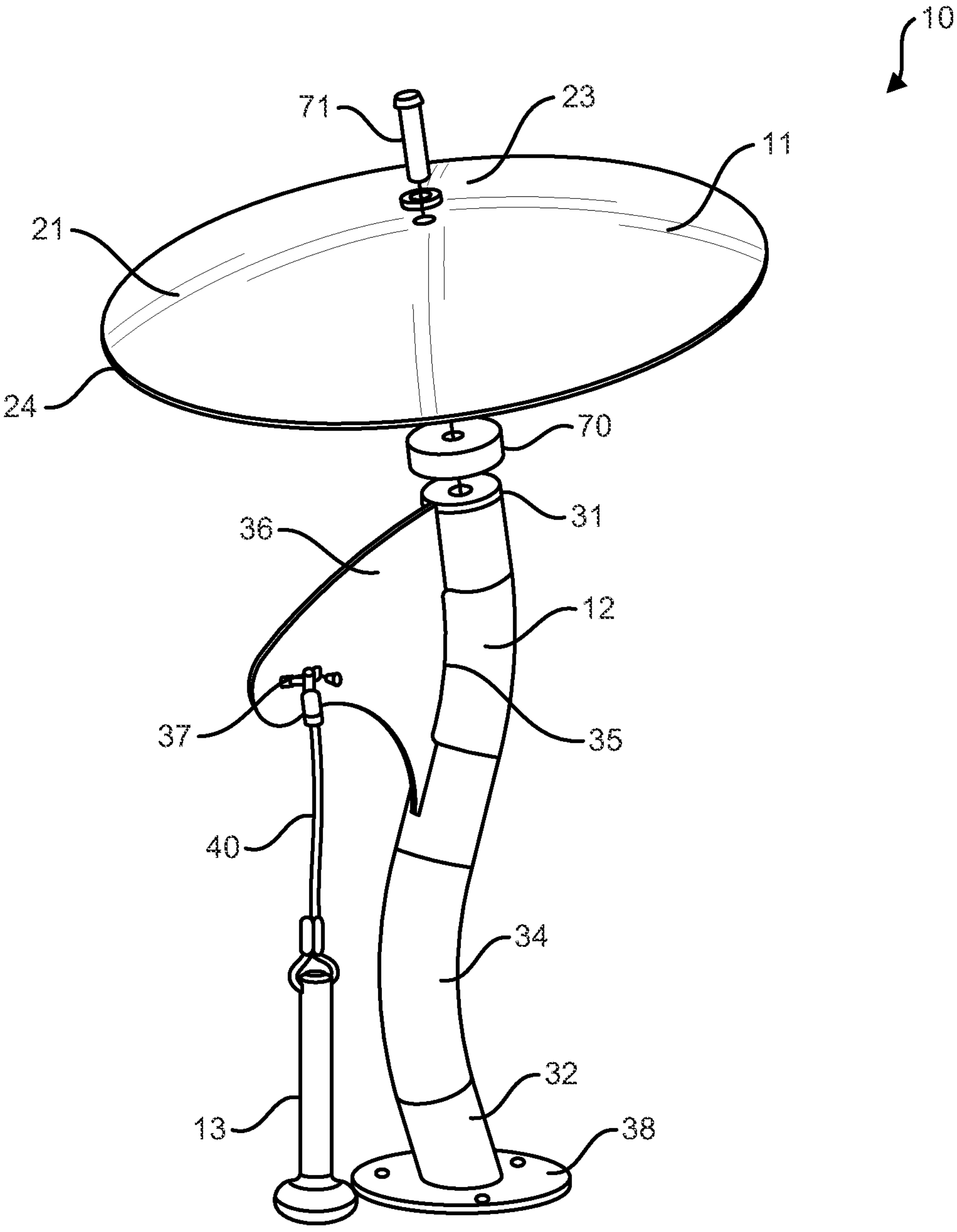
FIG. 6 is an exploded perspective view of the embodiment shown in FIG. 1.

The isolator 70 may be made of any of a variety of materials, but is desirably made of a natural or synthetic rubber. In some embodiments, for instance, the isolator 70 may be made of neoprene. As shown in FIG. 4, the isolator 70 may be sandwiched between the bottom surface 22 of the metal dish 11 and the top end 31 of the support post 12. The thickness of the isolator 70 may play a role in the sustain of the note produced by the metal dish 11 when struck by a mallet 13. To provide a desired sustain, for example, the isolator 70 may have a thickness of at least 0.5 inches, alternatively at least 0.75 inches, alternatively at least 1 inch, with the thickness being measured between the and bottom surfaces (i.e. the surfaces that come into contact with, respectively, the bottom surface 22 of the dish 11 and the top surface 31 of the support post 12).

As shown in FIG. 4, the metal dish 11 may be mounted to the top of the support post 12 by a fastener that passes through the central portion 23 of the metal dish, through the isolator 70, and into an interior of the support post 12. In some embodiments, for instance, a threaded fastener 71 may pass through an aperture in the central portion of the metal dish 23, through an aperture of the isolator 70, and into a coupling nut 72 positioned within the support post 12. In order to provide an improved sound and sustain, a non-metal washer 73 may also be provided between the upper surface 21 of the metal dish 11 and the head of fastener 71. The non-metal washer 73 may be made of the same material as the isolator 70. For instance, in some embodiments, the non-metal washer 73 may be made of neoprene. Accordingly, in some embodiments, the metal dish 11 may be mounted to the top of the support post 31 by a threaded fastener 71 that passes, in descending order, through (i) a non-metal washer 73, (ii) a central aperture of the metal dish 11, (iii) an aperture of the non-metal isolator 70, and into (iv) a coupling nut 72 positioned within the support post 12.

As shown in the illustrated embodiments, the metal dish 11 may be mounted to the support post 12 using a single, centrally-located fastener 71. In other embodiments, however, a plurality of fasteners 71 may be utilized in much the same was as is described above and shown in FIG. 4. For instance, the metal plate 11 may have a plurality of apertures, the isolator 70 may have a plurality of apertures, and the support post 12 may comprise a plurality of coupling nuts 72, each of which is configured to receive one of the plurality of fasteners 71.

Figure 12:
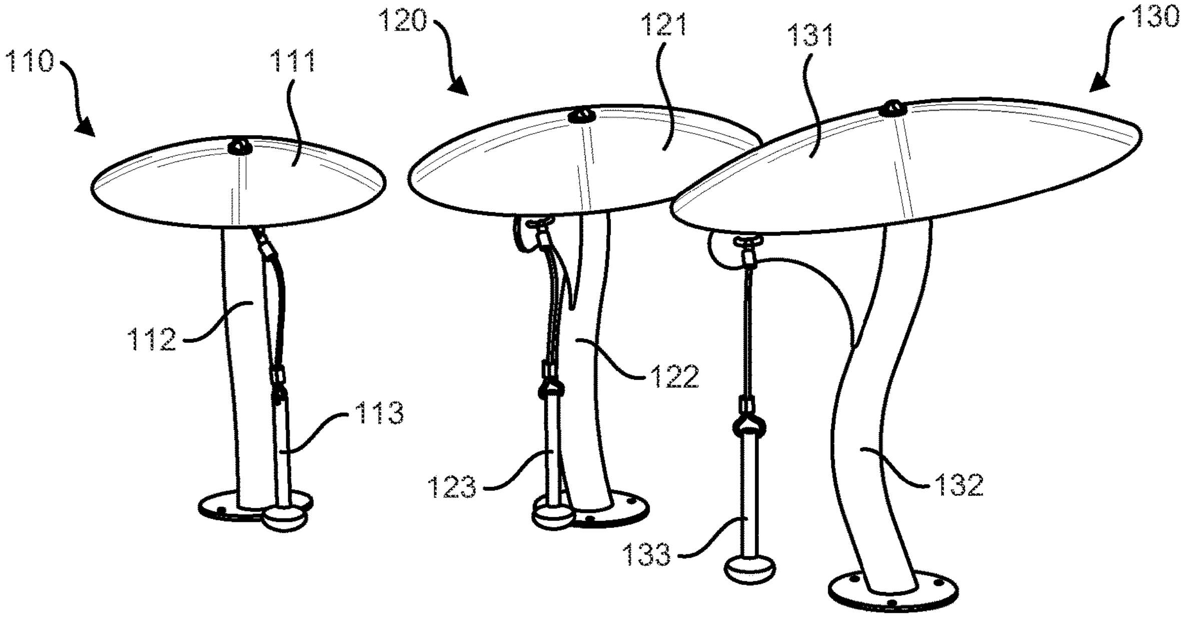
FIG. 12 is a perspective view of embodiments of outdoor mushroom instruments of different sizes mounted adjacent one another to create a unique play experience.

Aspects of the present disclosure are also directed to an outdoor arrangement of the musical instruments 10 described herein. Examples of such an arrangement are shown in FIGS. 12 and 13. An outdoor arrangement of musical instruments comprises at least a first musical instrument 110 and a second musical instrument 120, the first and second musical instruments 110, 120 being configured to produce different notes when struck by a mallet. One way in which this may be achieved is by the metal dish of the first instrument 111 having a first diameter and the metal dish of the second instrument 121 having a second diameter, with the second diameter being different from the first diameter. The first and second instruments 110, 120 may each have independent support posts 112, 122 and independent mallets 113, 123, as shown in FIGS. 12 and 13. Alternatively, the first and second instruments 110, 120 may have a shared support post and/or a shared mallet or mallets (not illustrated).

In some embodiments, the outdoor arrangement of musical instruments further comprises a third musical instrument 130. The third musical instrument 130 may be configured to produce a different note when struck by a mallet than both the first musical instrument 110 and the second musical instrument 120. One way in which this may be achieved is by the metal dish of the third instrument 131 having a third diameter, with the third diameter being different from both the diameter of the metal dish of the first instrument, i.e. the first diameter 111, and the diameter of the metal dish of the second instrument, i.e. the second diameter 121. The first, second, and third instruments 110, 120, 130 may each have independent support posts 112, 122, 132 and independent mallets 113, 123, 133, as shown in FIGS. 12 and 13. Alternatively, the first, second, and third instruments 110, 120, 130 may have a shared support post and/or a shared mallet or mallets (not illustrated).

By providing an arrangement of musical instruments in this manner, children may play the plurality of musical instruments, e.g. 110, 120, 130, together to create various musical compositions.

It can be seen that the described embodiments provide unique and novel outdoor instruments 10 and arrangements of instruments that have a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An outdoor arrangement of musical instruments comprising:

at least first and second musical instruments, each of the first and second musical instruments comprising:

a support post having a top end and a bottom end, the bottom end being mounted to an outdoor surface; and a metal dish having a top surface and a bottom surface, the metal dish extending downward from a center to a lower circumferential edge;

in which the metal dish is mounted to the top of the support post;

in which the metal dish is configured to replicate the cap of a mushroom and the support post is configured to replicate the stem of the mushroom; and in which the metal dish is configured to produce a note when the top surface is struck by a mallet;

wherein the metal dish of the first musical instrument has a first diameter and the metal dish of the second musical instrument has a second diameter, the second diameter being different from first diameter, and wherein the note produced by the second musical instrument is different from the note produced by the first musical instrument.

2. The outdoor arrangement of musical instruments of claim 1, wherein the support post of the first musical instrument and the support post of the second musical instrument are connected.

3. The outdoor arrangement of musical instruments of claim 1, wherein the support post of the first musical instrument and the support post of the second musical instrument extend in different directions, at different angles, or both from a common bottom end portion.

4. The outdoor arrangement of musical instruments of claim 3, wherein the support post of the first musical instrument and the support post of the second musical instrument extend in different directions and at different angles from a common bottom end portion.

5. The outdoor arrangement of musical instruments of claim 1, wherein the support post of each of the first and second musical instruments is curved.

6. The outdoor arrangement of musical instruments of claim 5, wherein the curvature of the support post of each of the first and second musical instruments places the top of the support post at an angle other than parallel with the outdoor surface to which the bottom end of the support post is mounted.

7. The outdoor arrangement of musical instruments of claim 6, wherein the angle is configured to facilitate striking of the top surface of the metal dish mounted thereto.

8. The outdoor arrangement of musical instruments of claim 6, wherein the top surface of the support post of each of the first and second musical instruments is placed at an angle between about 5 and about 30 degrees with respect to the outdoor surface to which the bottom end of the support post is mounted.

9. The outdoor arrangement of musical instruments of claim 1, further comprising one or more mallets, each of the one or more mallets being mounted to the support post of at least one of the first and second musical instruments by a cable.

10. The outdoor arrangement of musical instruments of claim 9, wherein each of the one or more mallets is mounted directly to the support post of at least one of the first and second musical instruments.

11. The outdoor arrangement of musical instruments of claim 9, wherein a mounting point of the mallet is within six inches radially of the outer circumferential edge of the metal plate that is mounted to the support post.

12. The outdoor arrangement of musical instruments of claim 1, wherein the support post of each of the first and second musical instrument comprises a coupling nut that receives a threaded fastener passing through a central aperture of the metal dish.

13. The outdoor arrangement of musical instruments of claim 1, wherein the support post of each of the first and second musical instruments comprises an in-ground portion that is positioned under the outdoor surface to which the musical instrument is mounted.

14. The outdoor arrangement of musical instruments of claim 1, wherein the metal dish of each of the first and second musical instruments is aluminum or an aluminum alloy.

15. The outdoor arrangement of musical instruments of claim 14, wherein at least the top and bottom surfaces of the metal dish are anodized.

16. The outdoor arrangement of musical instruments of claim 14, wherein the support post of each of the first and second musical instruments is steel.

17. The outdoor arrangement of musical instruments of claim 1, wherein a circumferential edge of the metal dish of each of the first and second musical instruments is rounded.

18. The outdoor arrangement of musical instruments of claim 1, wherein the support post of the first musical instrument and the support post of the second musical instrument extend in different directions, at different angles, or both from a common bottom end portion; and wherein the support post of each of the first and second musical instruments is curved.

19. The outdoor arrangement of musical instruments of claim 1, further comprising a third musical instrument, the third musical instrument comprising:

a support post having a top end and a bottom end, the bottom end being mounted to an outdoor surface; and a metal dish having a top surface and a bottom surface, the metal dish extending downward from a center to a lower circumferential edge;

in which the metal dish is mounted to the top of the support post;

in which the metal dish is configured to replicate the cap of a mushroom and the support post is configured to replicate the stem of the mushroom; and in which the metal dish is configured to produce a note when the top surface is struck by a mallet;

wherein the metal dish of the third musical instrument has a third diameter, the third diameter being different from both the first diameter and the second diameter, and wherein the note produced by the third musical instrument is different from the notes produced by both the first musical instrument and the second musical instrument.

20. The outdoor arrangement of musical instruments of claim 19, wherein the support post of the first musical instrument, the support post of the second musical instrument, and the support post of the third musical instrument each extend in different directions, at different angles, or both from a common bottom end portion.

* * * * *